US011883932B2

(12) United States Patent
Chen et al.

(10) Patent No.: US 11,883,932 B2
(45) Date of Patent: Jan. 30, 2024

(54) CLAW ASSEMBLY OF A PULLER

(71) Applicants: Yi-Fang Chen, Taichung (TW); Wei-Li Chen, Taichung (TW)

(72) Inventors: Yi-Fang Chen, Taichung (TW); Wei-Li Chen, Taichung (TW)

( * ) Notice: Subject to any disclaimer, the term of this patent is extended or adjusted under 35 U.S.C. 154(b) by 329 days.

(21) Appl. No.: 17/458,540

(22) Filed: Aug. 27, 2021

(65) Prior Publication Data

US 2022/0152798 A1 May 19, 2022

Related U.S. Application Data

(63) Continuation-in-part of application No. 17/213,219, filed on Mar. 26, 2021, now abandoned.

(30) Foreign Application Priority Data

Nov. 18, 2020 (TW) ................................ 109215166

(51) Int. Cl.
*B25B 27/00* (2006.01)
*B25B 27/02* (2006.01)

(52) U.S. Cl.
CPC ........ *B25B 27/023* (2013.01); *B25B 27/0035* (2013.01)

(58) Field of Classification Search
CPC ....... B25B 27/00; B25B 27/023; B25B 27/02; B25B 27/0035; B25B 27/062
See application file for complete search history.

(56) References Cited

U.S. PATENT DOCUMENTS

| | | | | |
|---|---|---|---|---|
| 3,651,557 | A * | 3/1972 | Bagley | B25B 27/023 29/260 |
| 5,887,328 | A * | 3/1999 | Rydin | B25B 27/02 29/259 |
| 2015/0246436 | A1* | 9/2015 | Huang | B25B 27/062 29/256 |
| 2016/0151867 | A1* | 6/2016 | Chen | B25B 27/062 29/261 |
| 2020/0130143 | A1* | 4/2020 | Wang | B25B 5/10 |
| 2022/0152797 | A1* | 5/2022 | Chen | B25B 27/023 |
| 2022/0152798 | A1* | 5/2022 | Chen | B25B 27/0035 |

* cited by examiner

*Primary Examiner* — Lee D Wilson
(74) *Attorney, Agent, or Firm* — Bruce Stone LLP; Joseph A. Bruce

(57) ABSTRACT

A claw assembly includes a collar, claws and a synchronizer. The collar includes slots. The claws are pivotally connected to the collar. Each of the claws includes a protuberance extending into the collar via one of the slots. The protuberances are movable along the slots. The synchronizer includes a receiving portion for receiving the protuberances. The receiving portion of the synchronizer is movable in the collar between an opening position and a closing position. The synchronizer opens the claws by the protuberances in the opening position. The synchronizer closes the claws by the protuberances in the closing position.

14 Claims, 14 Drawing Sheets

CLAW ASSEMBLY OF A PULLER

CROSS REFERENCE TO RELATED APPLICATIONS

This application is a continuation in part of U.S. patent application Ser. No. 17/213,219, filed on Mar. 26, 2021. The entirety of the above application is incorporated herein by reference.

BACKGROUND OF INVENTION

1. Field of Invention

The present invention relates to a puller and, more particularly, to a simple, efficient, safe and easy-to-use claw assembly of a puller.

2. Related Prior Art

Various annular elements such as bearings, gears and pulleys are used on various axles. To remove an annular element from an axle, pullers are used. A conventional puller includes two claws pivotally connected to a collar. An abutting element such as a threaded rod or a hydraulic device is inserted in the collar. In use, the claws are engaged with the annular element. Then, the abutting element is operated to abut an end thereof against an end of the axle. The operation of the abutting element is continued to move the collar and the claws away from the axle. Thus, the annular element is detached from the axle. However, the claws are not interconnected so that each of the claws is engaged with or disengaged from a portion of the annular element independent of the other claw. Attention has to be paid to the engagement of each of the claws with the corresponding portion of the annular element because the former might be disengaged from the latter accidentally. Such accidental disengagement is hazardous for a user of the puller.

The present invention is therefore intended to obviate or at least alleviate the problems encountered in the prior art.

SUMMARY OF INVENTION

It is the primary objective of the present invention to provide a simple, efficient, safe and convenient puller.

To achieve the foregoing objective, the claw assembly includes a collar, claws and a synchronizer. The collar includes slots. The claws are pivotally connected to the collar. Each of the claws includes a protuberance extending into the collar via one of the slots. The protuberances are movable along the slots. The synchronizer includes a receiving portion for receiving the protuberances. The receiving portion of the synchronizer is movable in the collar between an opening position and a closing position. The synchronizer opens the claws by the protuberances in the opening position. The synchronizer closes the claws by the protuberances in the closing position.

Other objectives, advantages and features of the present invention will be apparent from the following description referring to the attached drawings.

BRIEF DESCRIPTION OF DRAWINGS

The present invention will be described via detailed illustration of five embodiments versus the prior art referring to the drawings wherein.

DETAILED DESCRIPTION OF EMBODIMENTS

Figure 9:
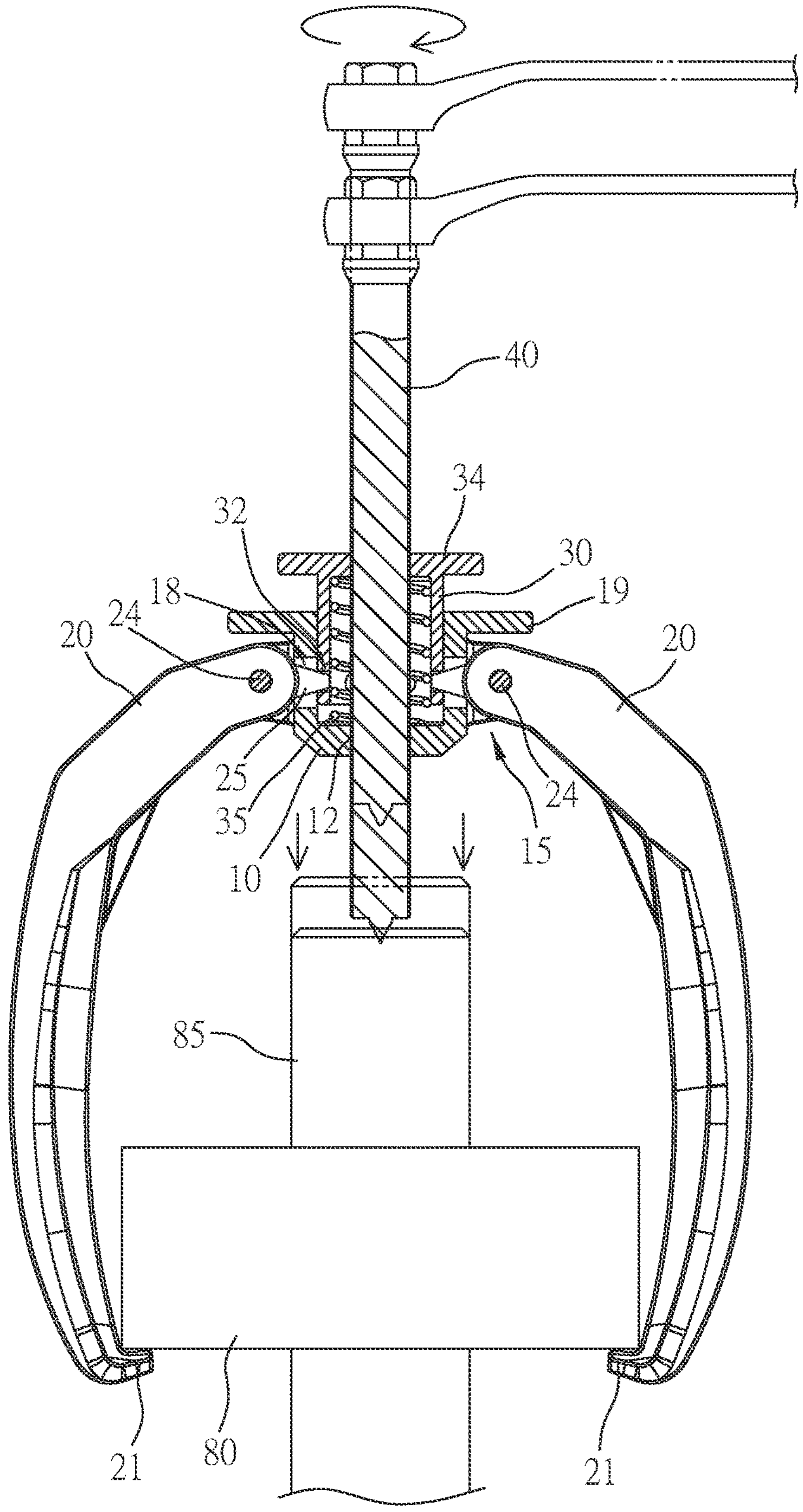
FIG. 9 is a cross-sectional view of the puller shown in FIG. 7.

Referring to FIGS. 1 through 5, a claw assembly includes a collar 10, two claws 20 and a synchronizer 30 according to a first embodiment of the present invention. The claws 20 are pivotally connected to the collar 10. The synchronizer 30 is used to synchronize the pivoting of the claws 20 to claw an annular element 80 to be detached from an axle 85 (FIG. 9).

The collar 10 includes a space 11, two opposite slots 18 in communication with the space 11, and two opposite pivotal connectors 15 formed on the periphery of the collar 10. The space 11 includes an open upper end and a closed lower end. Thus, the collar 10 is shaped like a cup. Each of the pivotal connectors 15 includes two lugs 16 each of which is formed with an aperture 17. Each of the slots 18 is located between the lugs 16 of a corresponding one of the pivotal connectors 15. Each of the slots 18 includes a closing limit 181 and an opening limit 182. The limits 181 and 182 of each of the slots 18 are used to limit the range of the pivoting of a corresponding one of the claws 20.

Figure 14:
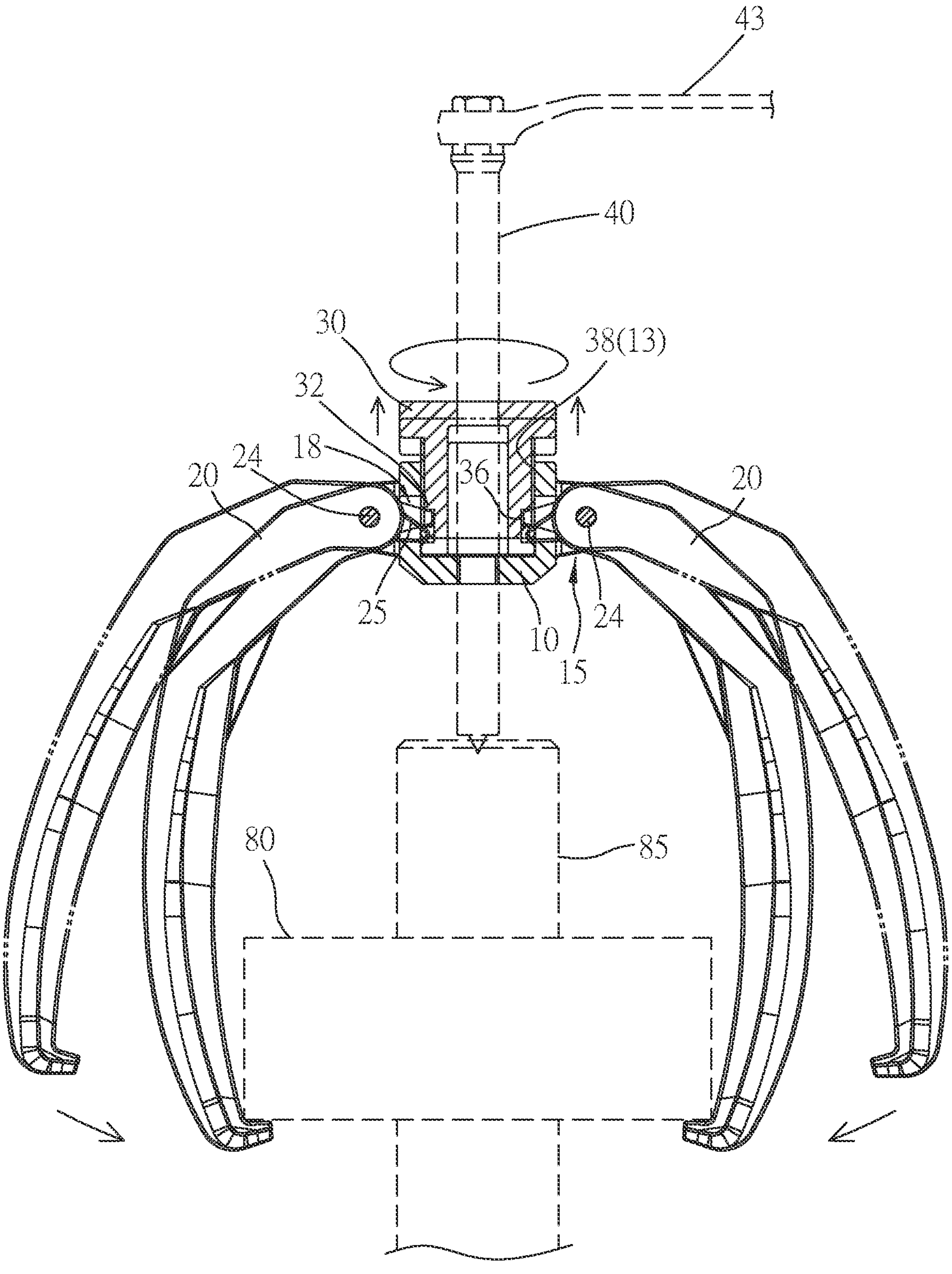
FIG. 14 is a cross-sectional view of a puller including the claw-assembly shown in FIG. 11.

Each of the claws 20 includes a protuberance 25 at an upper end and a pivotally connective portion 22 adjacent to the protuberance 25. The pivotally connective portion 22 of each of the claws 20 is formed with an aperture 23. In operation, a lower end of each of the claws 20 is used for engagement with a portion of the annular element 80 (FIG. 14).

In assembly, the protuberance 25 of each of the claws 20 is movably inserted in a corresponding one of the slots 18 so that the upper end of each of the claws 20 is located between the lugs 16 of a corresponding one of the pivotal connectors 15. A pivot 24 is fitted in the apertures 17 of the lugs 16 of each of the pivotal connectors 15 and the aperture 23 of a corresponding one of the claws 20. Thus, the pivotally connective portion 22 of each of the claws 20 is pivotally connected to a corresponding one of the pivotal connectors 15 of the collar 10. Each of the pivots 24 can be a pin, a rivet or a combination of a threaded bolt with a nut.

As mentioned above, the protuberances 25 of the claws 20 are movably inserted in the slots 18 of the collar 10. Thus, the protuberances 25 are moved in and along the slots 18 as the claws 20 are pivoted relative to the collar 10. Each of the protuberances 25 includes a closing limit 251 on an upper face and an opening limit 252 on a lower face. The closing limits 251 of the protuberances 25 are in contact with the closing limits 181 of the slots 18 to limit the closing of the claws 20. The closing limits 251 of the protuberances 25 are in contact with the opening limit 182 of the slots 18 to limit the opening of the claws 20. The limits 181 and 182 of each of the slots 18 extend away from each other as they extend to an internal face of the collar 10 from an external face of the collar to enlarge the angle of the pivoting of a corresponding one of the claws 20.

The synchronizer 30 is shaped like a cap, i.e., it includes a closed upper end and an open lower end. The synchronizer 30 is formed with a receiving portion 32 at a lower end. The receiving portion 32 of the synchronizer 30 includes several bores 33. The bores 33 can be made only in an external face of the synchronizer 30 or throughout the synchronizer 30 in a radial direction.

In assembly, the synchronizer 30 is movably inserted in the space 11 of the collar 10. A spring 35 is compressed between the synchronizer 30 and the collar 10 so that the spring 35 tends to move the synchronizer 30 away from the collar 10. The spring 35 includes an end in contact with the closed upper end of the synchronizer 30 and another end in contact with the closed lower end of the collar 10. The spring 35 is hidden in the combination of the collar 10 with the synchronizer 30 in consideration of aesthetics of the puller and safety of a user.

The protuberance 25 of each of the claws 20 is inserted in a corresponding one of the bores 33 of the synchronizer 30. Thus, the synchronizer 30 is moved relative to the collar 10 to synchronously pivot the claws 20 relative to the collar 10. To keep the protuberances 25 in the corresponding one of the bores 33, the protuberances 25 are made with an adequate length and strength.

Figure 1:
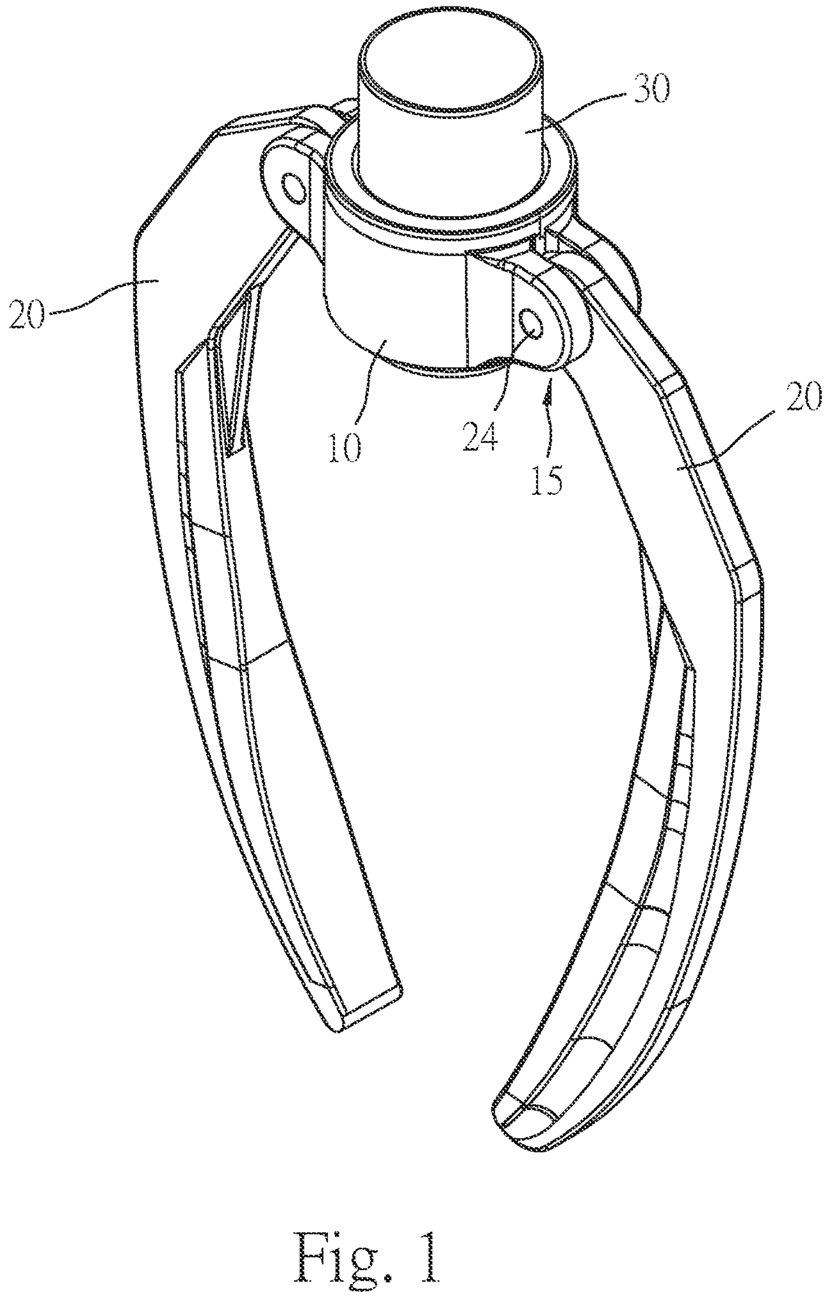
FIG. 1 is a perspective view of a claw assembly according to the first embodiment of the present invention.
Figure 2:
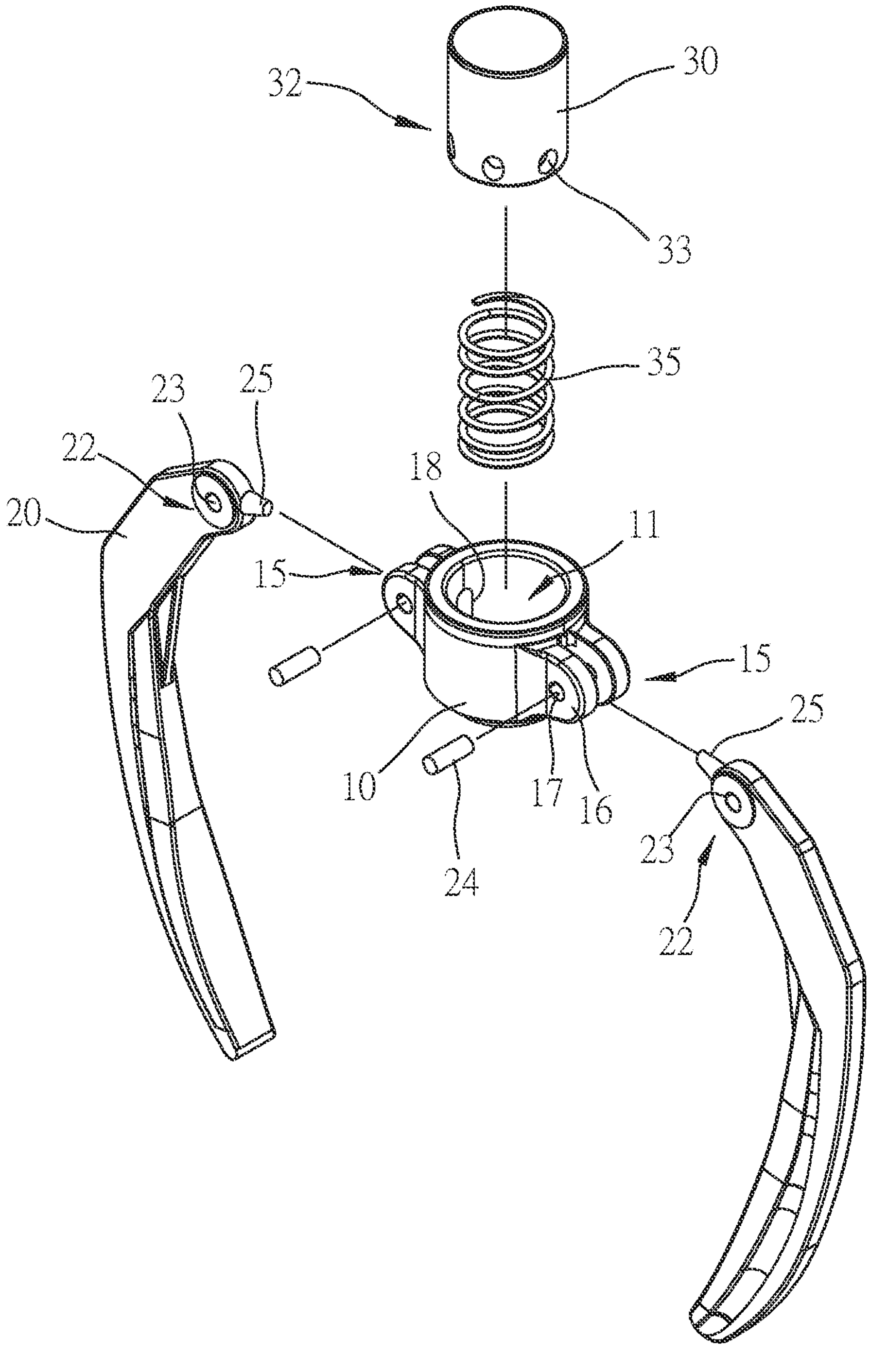
FIG. 2 is an exploded view of the claw assembly shown in FIG. 1.
Figure 3:
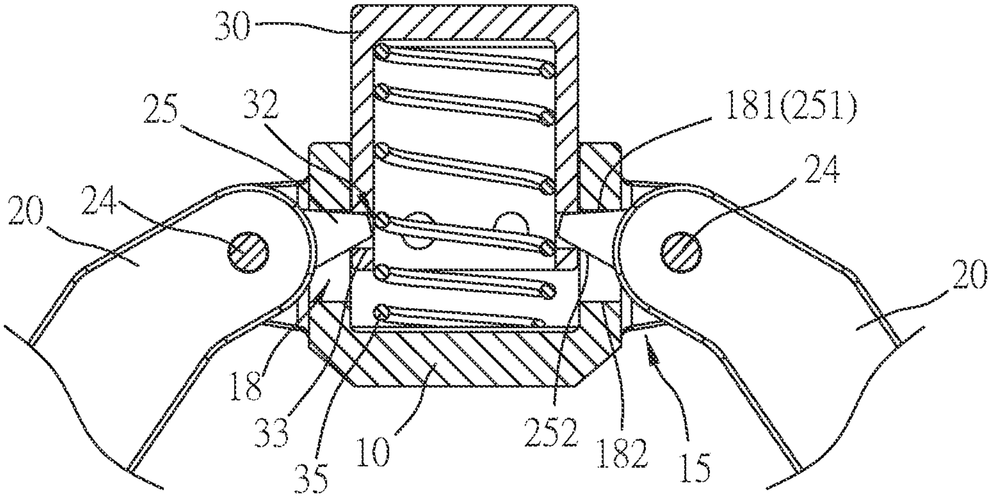
FIG. 3 is an enlarged, partial and cross-sectional view of the claw assembly shown in FIG. 1.
Figure 5:
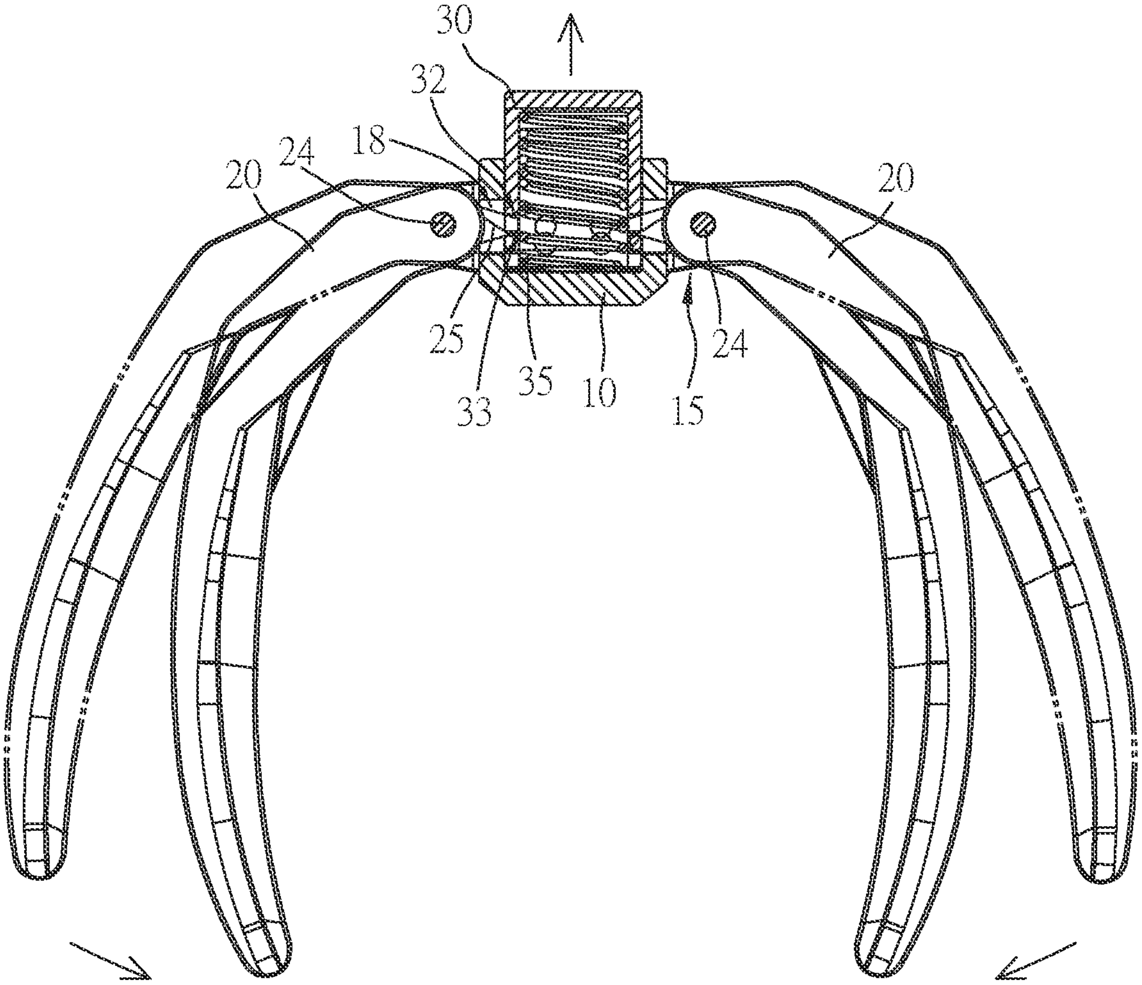
FIG. 5 is a cross-sectional view of the claw assembly shown in FIG. 1.

Referring to FIG. 3 and as shown in solid lines in FIG. 5, the spring 35 keeps the synchronizer 30 in an upper position relative to the collar 10. The synchronizer 30 retains the protuberances 25 of the claws 20 in an upper position relative to the collar 10 so that the claws 20 are pivoted toward an axis of the collar 10 about the pivots 24, i.e., closed. The closing limit 251 of the protuberance 25 of each of the claws 20 is in contact with the closing limit 181 of each of the slots 18 of the collar 10 so that the angle between each of the claws 20 and the axis of the collar 10 is at a smallest value. Moreover, the protuberances 25 keep the receiving portion 32 of the synchronizer 30 in the collar 10, thereby keeping the spring 35 in position.

Figure 4:
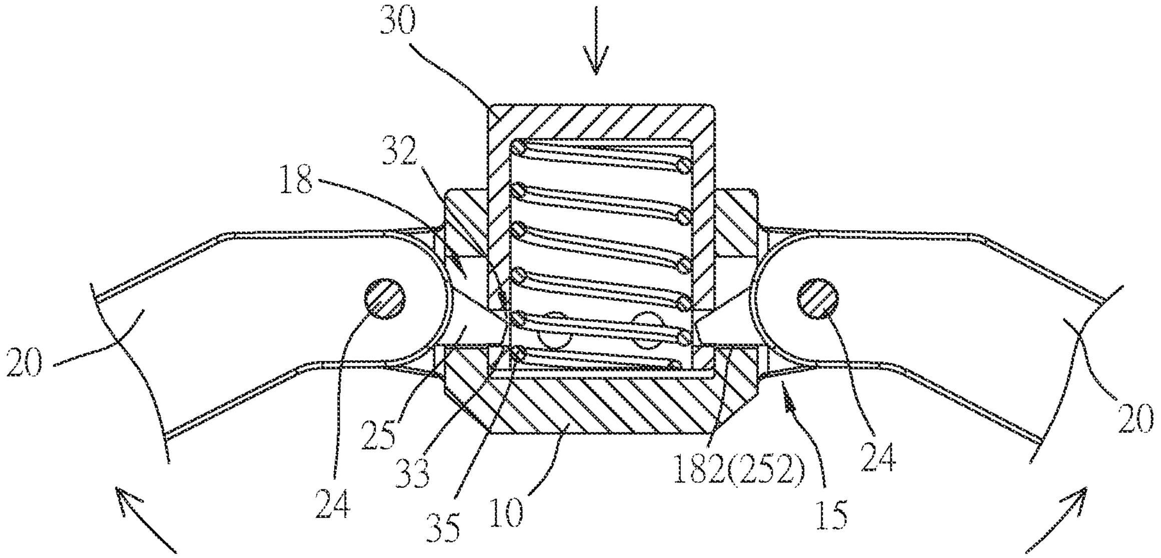
FIG. 4 is an enlarged, partial and cross-sectional view of the claw assembly in another position than shown in FIG. 3.

Referring to FIG. 4 and as shown in phantom lines in FIG. 5, the synchronizer 30 is moved to a lower position relative to the collar 10. Accordingly, the spring 35 is compressed. The synchronizer 30 brings the protuberances 25 of the claws 20 to a lower position relative to the collar 10 so that the claws 20 are pivoted away from the axis of the collar 10, i.e., opened. The opening limit 252 of the protuberance 25 of each of the claws 20 is in contact with the opening limit 182 of each of the slots 18 of the collar 10 so that the angle between each of the claws 20 and the axis of the collar 10 is at a largest value.

Figure 6:
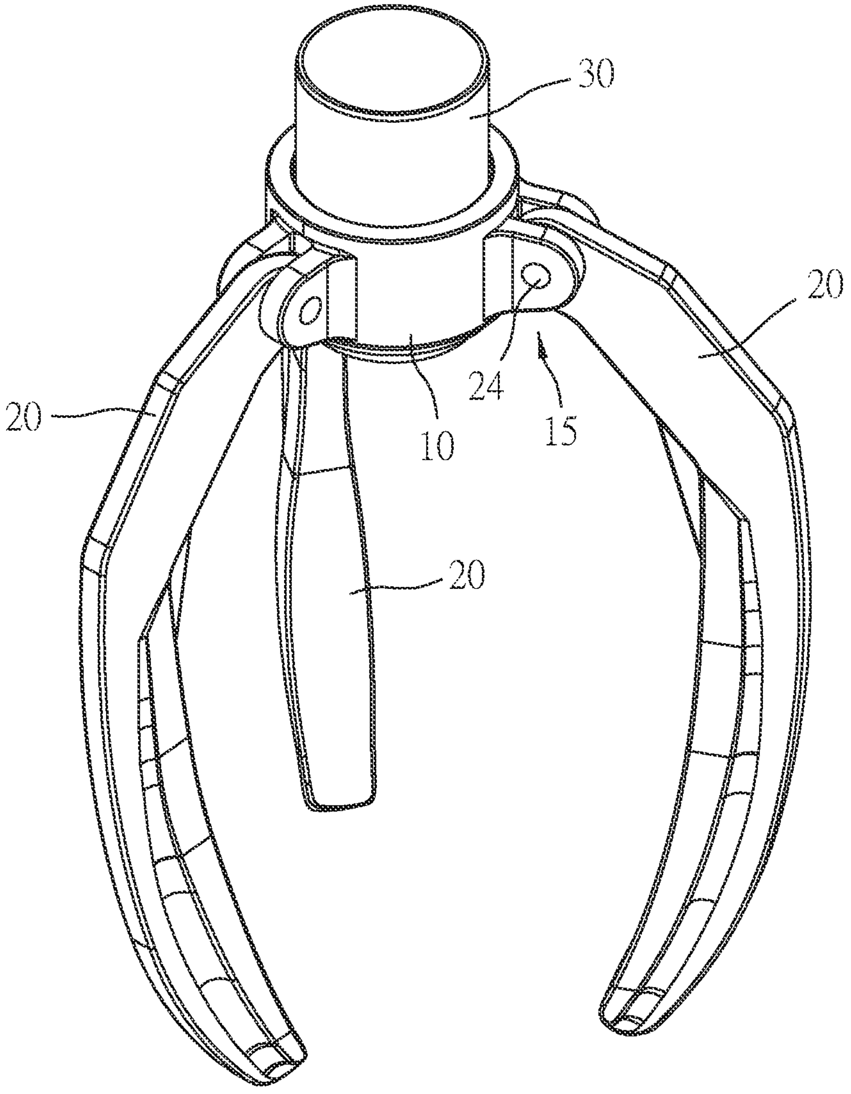
FIG. 6 is a perspective view of a claw assembly according to the second embodiment of the present invention.

Referring to FIG. 6, there is shown a claw assembly according to a second embodiment of the present invention. The second embodiment is identical to the first embodiment except for including three claws 20 connected to three pivotal connectors 15 of the claws 20 by three pins 24. Accordingly, the receiving portion 32 of the synchronizer 30 includes three bores 33 for receiving the protuberances 25 of the claws 20.

Figure 7:
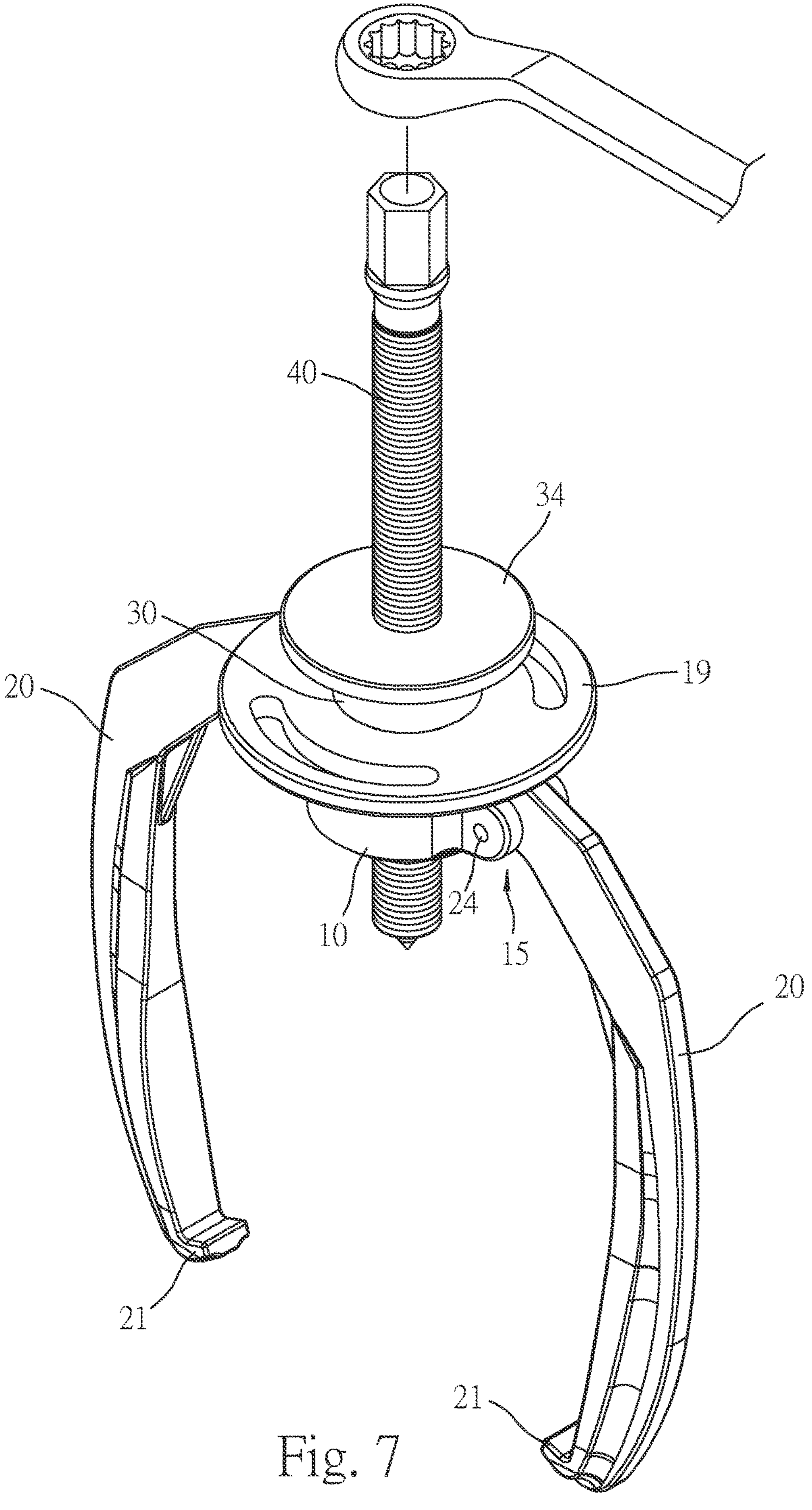
FIG. 7 is a perspective view of a puller including a claw-assembly according to the third embodiment of the present invention.
Figure 8:
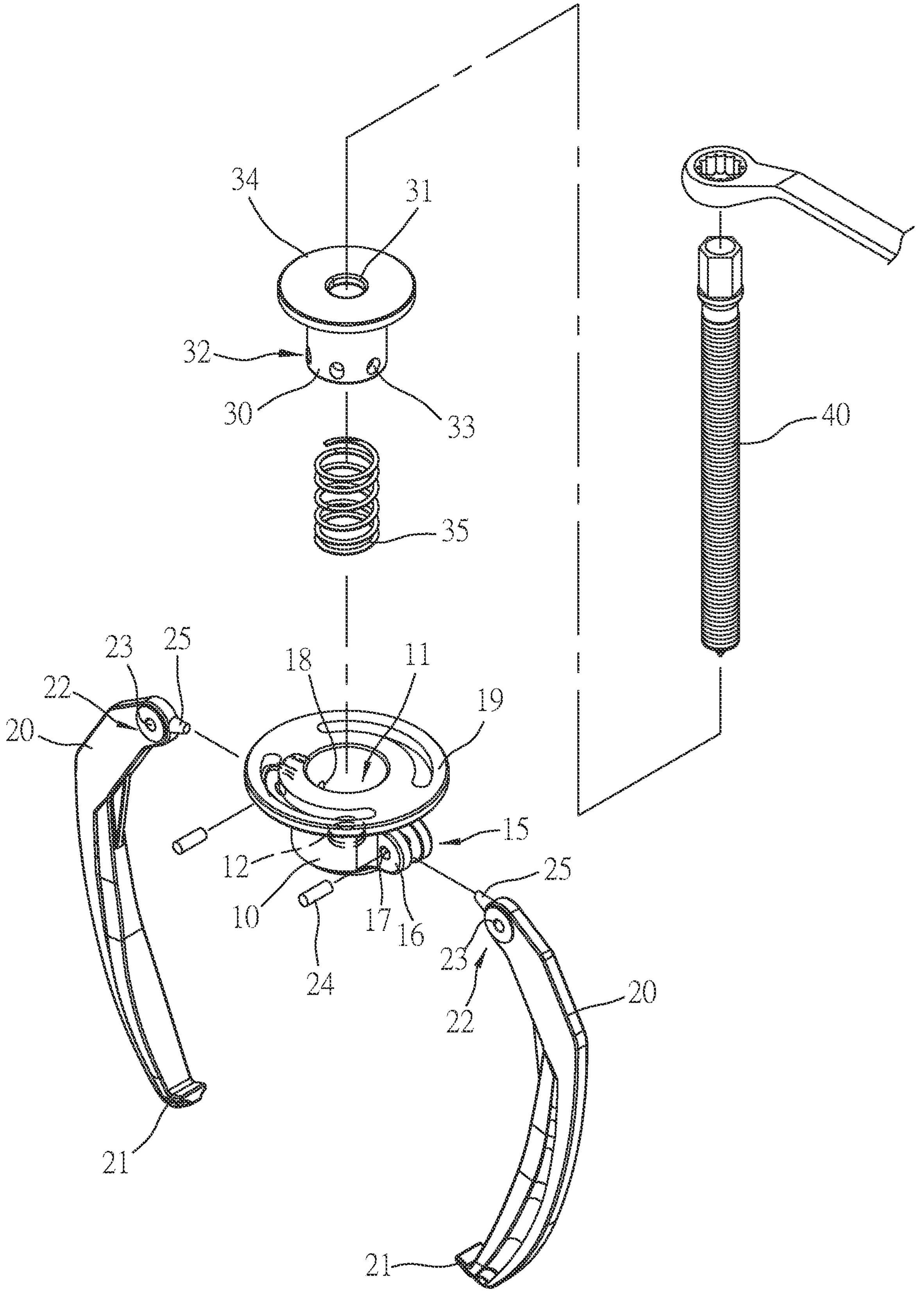
FIG. 8 is an exploded view of the puller shown in FIG. 7.

Referring to FIGS. 7 through 9, there is shown a puller including a threaded rod 40 and a claw assembly according to a third embodiment of the present invention. The third embodiment is like the first embodiment except for several things. Firstly, the collar 10 includes a flange 19 at the upper end and a screw hole 12 in the lower end. Secondly, the upper end of the synchronizer 30 is formed with a flange 34 including an aperture 31. Thirdly, each of the claws 20 is formed with a barb 21 at the lower end.

Referring to FIG. 9, in operation, the barbs 21 of the claws 20 are engaged with the annular element 80. The threaded rod 40 extends axially throughout the flanges 19 and 34, the synchronizer 30, the spring 35 and the collar 10. The threaded rod 40 is inserted in the screw hole 12 via the aperture 31. A lever 43 is engaged with an upper end of the threaded rod 40 so that the lever 43 is used to rotate the threaded rod 40 relative to the collar 10, thus axially moving the threaded rod 40 relative to the collar 10. A lower end of the threaded rod 40 is abutted against an end of the axle 85. The puller lifts the annular element 80 relative to the axle 85 as the lower end of the threaded rod 40 moves further from the collar 10.

Figure 10:
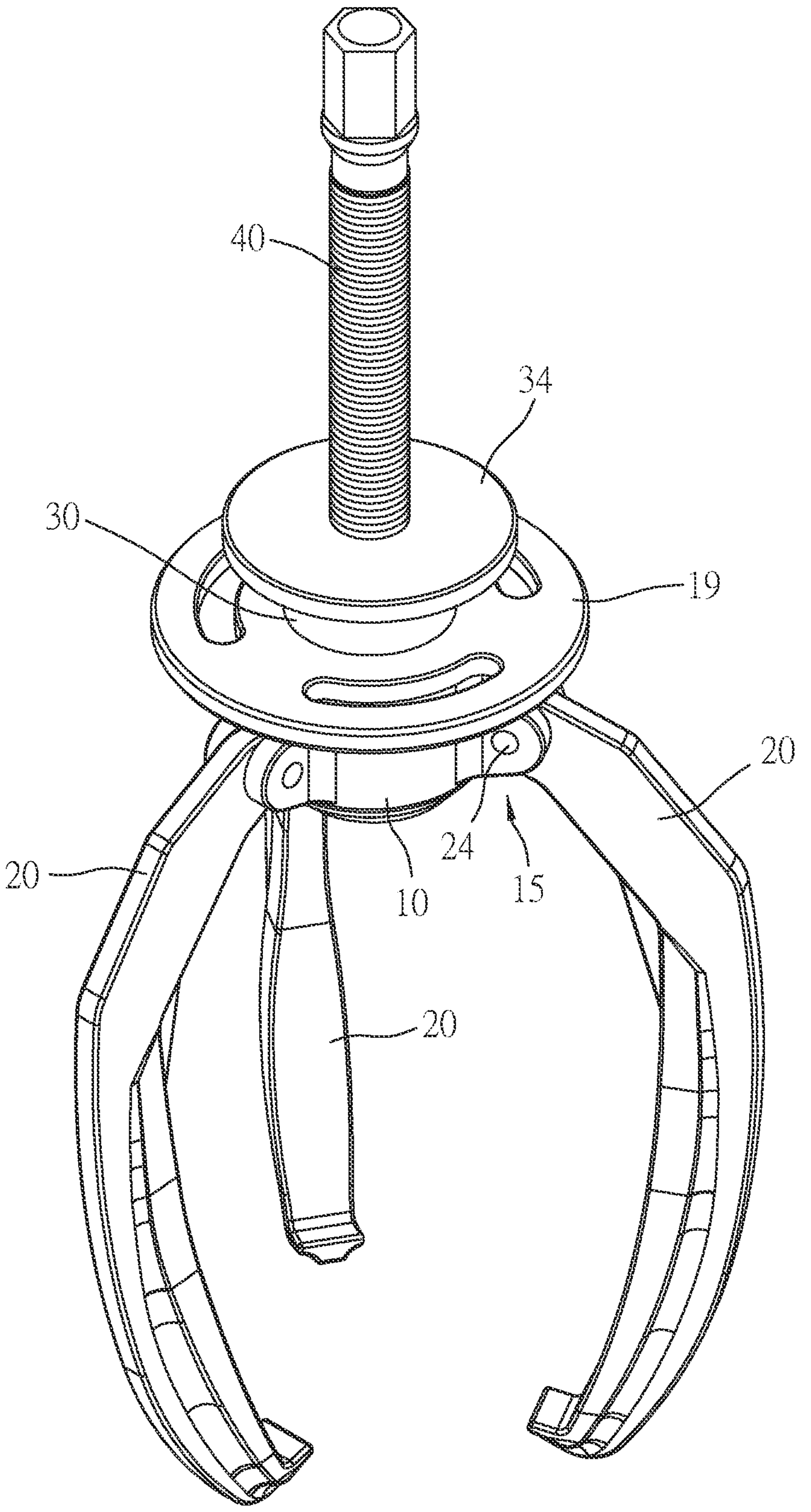
FIG. 10 is a perspective view of a puller including a claw-assembly according to the fourth embodiment of the present invention.

Referring to FIG. 10, a puller includes the threaded rod 40 and a claw assembly according to a fourth embodiment of the present invention. The fourth embodiment is identical to the third embodiment except for including three claws 20 connected to three pivotal connectors 15 of the claws 20 by three pins 24. Accordingly, the receiving portion 32 of the synchronizer 30 includes three bores 33 for receiving the protuberances 25 of the claws 20.

Figure 11:
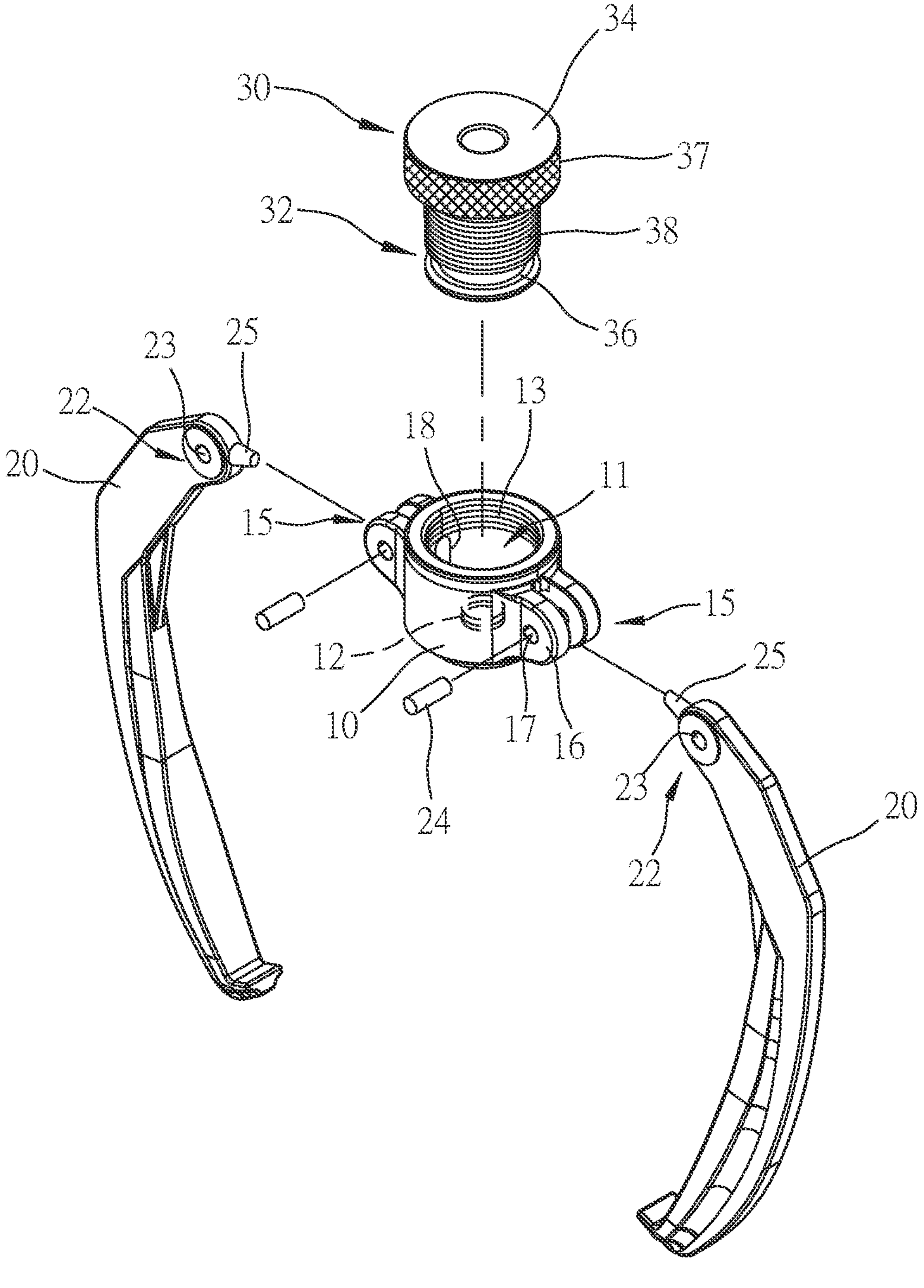
FIG. 11 is an exploded view of a claw assembly according to the fifth embodiment of the present invention.
Figure 12:
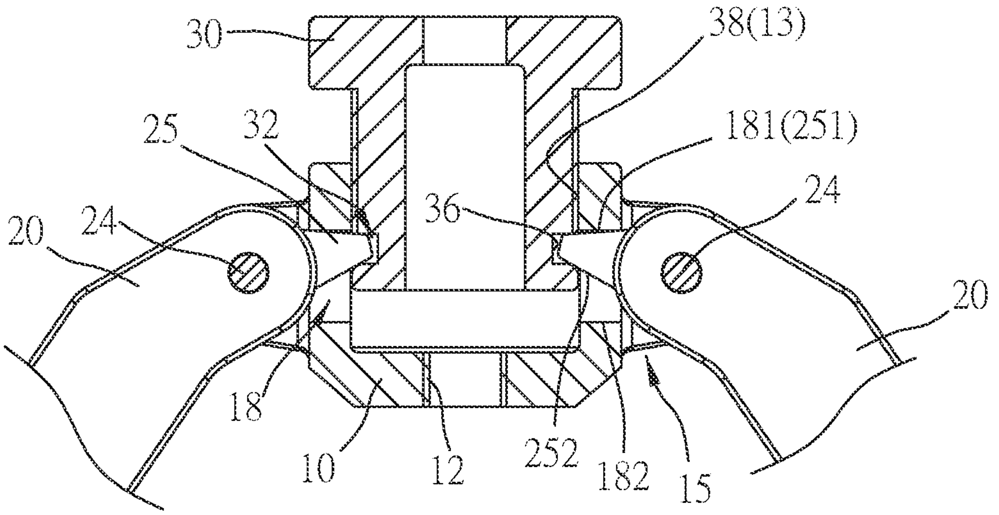
FIG. 12 is an enlarged, partial and cross-sectional view of the claw assembly shown in FIG. 11.
Figure 13:
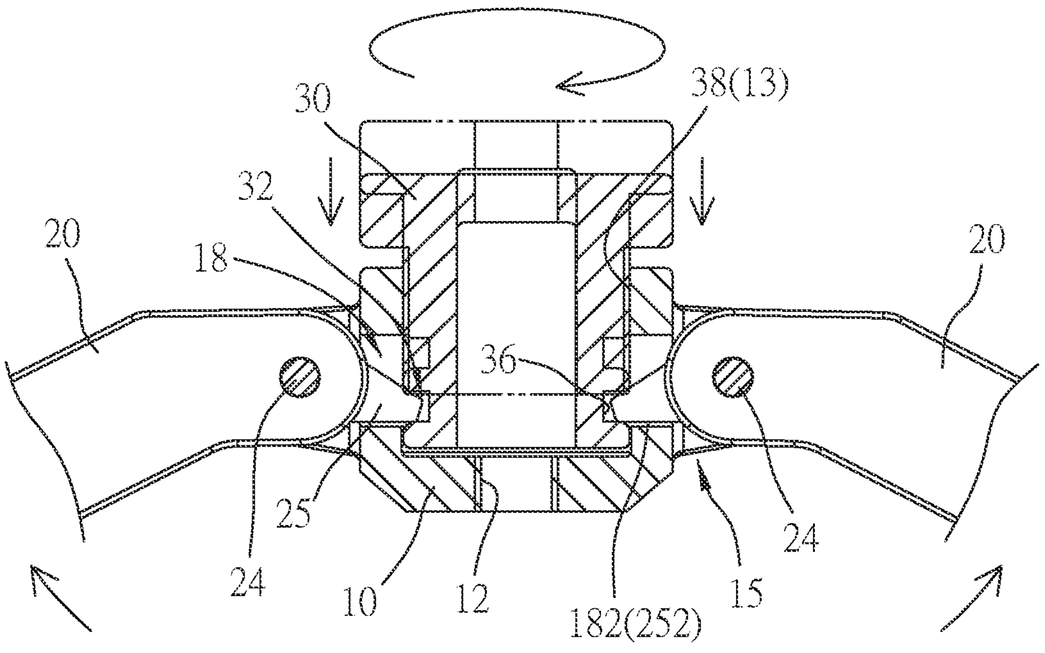
FIG. 13 is an enlarged, partial and cross-sectional view of the claw assembly in another position than shown in FIG. 12.

Referring to FIGS. 11 through 13, there is shown a claw assembly according to a fifth embodiment of the present invention. The fifth embodiment is like the third embodiment except for several things. Firstly, the collar 10 includes a thread 13 formed on an internal face. Secondly, the synchronizer 30 includes, on an external face, a thread 38 engaged with the thread 13. Thirdly, the receiving portion 32 of the synchronizer 30 is formed with a groove 36 instead of the bores 33. The groove 36 receives the protuberances 25 of the claws 20. Fourthly, an anti-skid pattern 37 is formed on the periphery of the flange 34. The anti-skid pattern 37 is used to facilitate rotation of the synchronizer 30 relative to the collar 10.

Referring to FIG. 12 and as shown in solid lines in FIG. 14, the synchronizer 30 is moved to the upper position relative to the collar 10 by rotating the synchronizer 30 relative to the collar 10 because of the engagement of the thread 38 with the thread 13. The synchronizer 30 brings the protuberances 25 of the claws 20 to the upper position relative to the collar 10 so that the claws 20 are pivoted toward the axis of the collar 10 about the pivots 24, i.e., closed. The closing limit 251 of the protuberance 25 of each of the claws 20 is in contact with the closing limit 181 of each of the slots 18 of the collar 10 so that the angle between each of the claws 20 and the axis of the collar 10 is at the smallest value.

The barbs 21 of the claws 20 are engaged with the annular element 80. The lever 43 is engaged with an upper end of the threaded rod 40 so that the lever 43 is used to rotate the threaded rod 40 relative to the collar 10, thus axially moving the threaded rod 40 relative to the collar 10. The lower end of the threaded rod 40 is abutted against an end of the axle 85. The puller lifts the annular element 80 relative to the axle 85 as the lower end of the threaded rod 40 moves further from the collar 10.

Referring to FIG. 13 and as shown in phantom lines in FIG. 14, the synchronizer 30 is moved to the lower position relative to the collar 10. The synchronizer 30 brings the protuberances 25 of the claws 20 to the lower position relative to the collar 10 so that the claws 20 are pivoted away from the axis of the collar 10, i.e., opened. The opening limit 252 of the protuberance 25 of each of the claws 20 is in contact with the opening limit 182 of each of the slots 18 of the collar 10 so that the angle between each of the claws 20 and the axis of the collar 10 is at the largest value.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A claw assembly comprising:

a collar comprising slots;

claws pivotally connected to the collar, wherein each of the claws comprises a protuberance extending into the collar via one of the slots, wherein the protuberances are movable along the slots; and a synchronizer comprising a receiving portion for receiving the protuberances, wherein the receiving portion of the synchronizer is movable in the collar between an opening position and a closing position, wherein the synchronizer opens the claws by the protuberances in the opening position, wherein the synchronizer closes the claws by the protuberances in the closing position.

2. The claw assembly according to claim 1, wherein the collar comprises pivotal connectors located corresponding to the slots, wherein each of the claws is pivotally connected to one of the pivotal connectors.

3. The claw assembly according to claim 2, wherein each of the pivotal connectors comprises two lugs, wherein each of the slots is located between the lugs of a corresponding one of the pivotal connectors, wherein each of the claws is located between and pivotally connected to the lugs of a corresponding one of the pivotal connectors.

4. The claw assembly according to claim 3, wherein each of the lugs comprises an aperture, wherein each of the claws comprises an aperture for receiving a pivot extending throughout the aperture of a corresponding one of the lugs.

5. The claw assembly according to claim 1, wherein each of the slots comprises a closing limit for limiting closing of a corresponding one of the claws and an opening limit for limiting opening of a corresponding one of the claws.

6. The claw assembly according to claim 5, wherein the closing limit extends away from the opening limit of each of the slots as they extend to an internal face of the collar from an external of the collar to allow the claws to pivot in a large range.

7. The claw assembly according to claim 1, wherein the receiving portion of the synchronizer comprises bores for receiving the protuberances of the claw.

8. The claw assembly according to claim 1, wherein the receiving portion of the synchronizer comprises a groove for receiving the protuberances of the claw.

9. The claw assembly according to claim 1, further comprising a spring located between the synchronizer and the collar so that the spring tends to push the synchronizer away from the collar, thereby closing the claws.

10. The claw assembly according to claim 9, wherein the spring is a compression spring.

11. The claw assembly according to claim 1, wherein the collar comprises a thread formed on an internal face, wherein the synchronizer comprises, on an external face, a thread engaged with the thread of the collar so that the synchronizer is rotatable relative to the collar to translate the synchronizer relative to the collar to open and close the claws.

12. A puller comprising the claw assembly according to claim 1 and an abutment element extending throughout the collar and the synchronizer to abut against an axle while the claws engage with an annular element to be detached from the axle.

13. The puller according to claim 12, wherein the abutment element comprises a threaded rod, wherein the collar comprises a screw hole for receiving the threaded rod.

14. The puller according to claim 12, wherein the abutment element comprises a cylinder device.

* * * * *